UNITED STATES PATENT OFFICE

WINFIELD SCOTT MORRISON, OF SAN FRANCISCO, CALIFORNIA.

PROCESS OF PREPARING CONCENTRATED HYDRATED MAGNESIA.

No. 900,868.

Specification of Letters Patent.

Patented Oct. 13, 1908.

Application filed January 30, 1908. Serial No. 413,436.

*To all whom it may concern:*

Be it known that I, WINFIELD S. MORRISON, a citizen of the United States, residing at San Francisco, in the county of San Francisco and State of California, have invented a new and useful Process of Preparing Concentrated Hydrated Magnesium Oxid, of which the following is a specification.

This invention relates to a process for concentrating hydrated magnesium oxid, also known as magnesium hydrate, magnesic hydroxid, milk of magnesia et cetera; and has for its object to reduce the well known milky preparation of hydrated magnesium oxid to a soft pasty mass, useful for various purposes, but especially valuable as a base for tooth paste.

Magnesium oxid, prepared by precipitating the oxid from a solution of a soluble magnesium salt with the aid of a soluble caustic alkali, is a simple and well known chemical process and can be carried out with little preparation and apparatus. It is also known that if the freshly precipitated magnesium oxid be subjected to a prolonged boiling in water, its character, nature, or condition is changed in such manner that it will no longer subside or settle as when first precipitated, but remains in suspension in the water forming a milky looking liquid, and for that reason called "milk of magnesia," more correctly hydrated magnesium oxid.

The concentrated hydrated magnesium oxid or magnesium magma may be prepared by first precipitating magnesium oxid from a hot solution of magnesium sulfate by the aid of a solution of potassium hydroxid or sodium hydroxid; or magnesium chlorid may be used in conjunction with either of the aforementioned alkalies. It is, however, preferred to use magnesium sulfate and precipitate the magnesium oxid with sodium hydroxid.

After precipitating the magnesium oxid it is then decanted and boiled with fresh water each day for about six days. Following this treatment the hydrated magnesium oxid is withdrawn from the boiling tank and appears as a white or milky looking liquid produced by the finely divided flocculent particles of magnesium oxid held in suspension therein which will not separate nor settle appreciably upon standing, and with a specific gravity of 104.8 thereabouts.

Having thus obtained the milk of magnesia in liquid form it becomes necessary to reduce the oxid to a soft unctuous mass of plastic consistency and without any appreciable amount of free water. The success of this step depends upon the care exercised in concentrating proper, the milk of magnesia. This liquid is first poured upon a cloth strainer, returning again and again the first portion that passes through until the liquid runs clear. When all the liquid has passed through the strainer, the concentrate is left to drain thoroughly. This requires about six days, after which the concentrate or magma is squeezed through a fine linen strainer and spread out to dry, preferably upon trays in a dry room kept at a temperature of about 100 degrees F. The trays are for convenience, arranged in a rack and are drawn out each day and the magma thoroughly mixed, a necessary operation to prevent lumps or granular crusts from forming in the mass. The drying proceeds slowly under this treatment and requires from five to ten days according to the humidity of the atmosphere. When the magma appears to be of the right consistency the contents of all the trays are mixed together in a large container and weighed. Should the need of further concentration be developed, the mass is again spread on the trays and subjected to further drying until in proper condition for the purpose desired, best determined by experience.

The temperature of the drying room should not exceed 100 degrees F., as a too rapid drying has an injurious effect upon the preparation by destroying in a greater or lesser degree the unctuous consistency which renders the magma so valuable as a base for tooth paste. The magma has other properties which increase its worth as it is anti-acid and unique in that it is free from sugar, glucose, soap, and other more or less harmful substances; it is a mild alkali and sparingly soluble in a neutral or alkaline liquid, but freely soluble in acidulous liquids which it quickly neutralizes.

Since most injury to the teeth is caused by acids generated from saccharine or similar substances lodged between the teeth, the magma or concentrated hydrated magnesium oxid, acting as a rapid neutralizer of the acids, prevents decay of the teeth and also acts as a specific for the removal of tartar, being a solvent of such deposits.

I claim:—

1. The process of concentrating hydrated magnesium oxid consisting in subjecting magnesium oxid to prolonged boiling in water whereby its condition is changed and hydrated magnesium oxid is formed, separating the same from the bulk of its free water by repeated straining, then allowing the concentrate to drain for a number of days, afterwards squeezing it through a fine strainer, and finally subjecting it to a temperature of about one hundred degrees F. until sufficiently dry for use, the products being thoroughly stirred while drying.

2. The process of concentrating milk of magnesia which consists in passing the milk of magnesia repeatedly through a strainer until it runs clear and the hydrated magnesium oxid remains in the strainer, then let the concentrate drain for about six days after which it is squeezed through a fine strainer, and finally subjected to a temperature of about one hundred degrees F. until sufficiently dry for use, the substance being thoroughly stirred while drying.

In testimony that I claim the foregoing as my own, I have hereto affixed my signature in the presence of two witnesses.

WINFIELD SCOTT MORRISON

Witnesses:
W. W. WORDEN,
A. H. FLYNN.